(12) United States Patent
Hennebert

(10) Patent No.: US 10,985,910 B2
(45) Date of Patent: Apr. 20, 2021

(54) METHOD FOR EXCHANGING KEYS AUTHENTICATED BY BLOCKCHAIN

(71) Applicant: COMMISSARIAT A L'ENERGIE ATOMIQUE ET AUX ENERGIES ALTERNATIVES, Paris (FR)

(72) Inventor: Christine Hennebert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 342 days.

(21) Appl. No.: 16/233,974

(22) Filed: Dec. 27, 2018

(65) Prior Publication Data
US 2019/0207757 A1 Jul. 4, 2019

(30) Foreign Application Priority Data
Dec. 29, 2017 (FR) ...................................... 17 63393

(51) Int. Cl.
| | |
|---|---|
| G06F 21/62 | (2013.01) |
| H04L 9/08 | (2006.01) |
| H04L 9/32 | (2006.01) |
| G06F 21/60 | (2013.01) |
| H04L 9/30 | (2006.01) |

(52) U.S. Cl.
CPC .......... *H04L 9/0844* (2013.01); *G06F 21/602* (2013.01); *H04L 9/0841* (2013.01); *H04L 9/0861* (2013.01); *H04L 9/3066* (2013.01); *H04L 9/3239* (2013.01); *H04L 9/3247* (2013.01); *H04L 2209/38* (2013.01)

(58) Field of Classification Search
CPC ............. G06Q 20/3825; G06Q 20/382; G06Q 20/401; H04L 9/3247; H04L 9/00; H04L 9/06; H04L 2209/38; H04L 9/0841; H04L 9/0844; H04L 9/0861; H04L 9/3066; H04L 9/3239; G06F 21/602; G06F 21/62
See application file for complete search history.

(56) References Cited

U.S. PATENT DOCUMENTS

2017/0228731 A1* 8/2017 Sheng .................. G06Q 20/401
2018/0032383 A1* 2/2018 Surcouf ................. H04L 9/088

OTHER PUBLICATIONS

U.S. Appl. No. 16/234,020, filed Dec. 27, 2018, 2019/0207760 A1, Christine Hennebert.
U.S. Appl. No. 15/944,103, filed Apr. 3, 2018, 2018/0288013 A1, Christine Hennebert, et al.
French Preliminary Search Report dated Aug. 6, 2018 in French Application 17 63393 filed on Dec. 29, 2017 (with English Translation of Categories of Cited Documents).
Mccorry, P. et al. "Authenticated Key Exchange over Bitcoin," School of Computing Science, Newcastle University, 2015, pp. 18.

(Continued)

*Primary Examiner* — Olugbenga O Idowu
(74) *Attorney, Agent, or Firm* — Oblon, McClelland, Maier & Neustadt, L.L.P.

(57) ABSTRACT

The invention relates to a method for exchanging keys between peers, of Diffie-Hellmann type, authenticated by means of a blockchain of transactions. The public keys of the peers are recorded in the ledger distributed by means of transactions transmitted by the peers, the latter being identified by their wallet addresses and authenticated by their respective signatures.

6 Claims, 2 Drawing Sheets

(56) References Cited

OTHER PUBLICATIONS

Kyogoku, T. et al. "A note on authenticated key exchange in cryptocurrency," SCIS, The Institute of Electronics, Information and Communication Engineers, 2016, pp. 8.
Thanh, B. et al. "Key exchange with the help of a public ledger," Springer International Publishing AG, 2017, pp. 14.
Sivakumar, P. "Privacy based decentralized public key infrastructure (PKI) implementation using smart contract in blockchain" National Institute of Technology, 2017, pp. 6.
Antonopoulos, A. "Mastering Bitcoin," O'Reilly Media Inc., 2014, pp. 274.

* cited by examiner

METHOD FOR EXCHANGING KEYS AUTHENTICATED BY BLOCKCHAIN

TECHNICAL FIELD

The present invention generally relates to cryptography and more specifically the generation of a secure channel between peers by means of a secrete key. It also relates to the blockchain technique.

PRIOR ART

The generation of a secure channel between remote devices, also called hereafter "peers", assumes the sharing of a secret key between these devices. This sharing may be done by a manual distribution of keys, prior to any communication on the channel, or instead by means of a Diffie-Hellmann type key exchange protocol using an asymmetric cryptosystem. It will be recalled that, in a Diffie-Hellman type key exchange protocol, each remote device has at its disposal a pair of asymmetric keys (private key, public key). The private key of a transmitter device is conserved secrete by the latter and is in particular never disclosed to the recipient device. It serves to cipher or sign messages and to identify the transmitter device. On the other hand, the public key is known to the recipient device and serves to decipher messages or to verify the signature of the transmitter device. The aim of the key exchange protocol is to enable, from public elements of a cryptosystem exchanged on a non-secure channel, each remote device to calculate independently a same secrete key that will serve to establish a secure channel between them.

When the cryptosystem is based on an elliptic curve $E(F_q)$ defined on a finite field $F_q$ and characterised by the domain parameters $(q,a,b,G,n,h)$ where $q$ is the number of elements of the field, $a,b$ are the parameters of the elliptic curve, $G$ is a generating point, $n$ is the order of $G$ in the additive group $E(F_q)$, $$h = \frac{|E(F_q)|}{n}$$

is the cofactor of $G$ in this group, $|E(F_q)|$ is the order of the group $E(F_q)$. Each remote device can choose a private key sk among the integers $[1,n-1]$, the corresponding public key being given by the coordinates of the point $Pk=sk.G$. It will be recalled that searching for sk from Pk comes down to searching for a solution to the ECLDP (Elliptic Curve Discrete Logarithm Problem), currently impossible to resolve in polynomial time.

If Alice and Bob are the two peers corresponding to the two remote devices, a Diffie-Hellmann key exchange protocol using an elliptic cryptosystem (ECDH protocol) may be described by the following steps:

Alice chooses an integer a which will remain secret, calculates the ephemeral public key, $P_a=a.G$, and transmits it to Bob.

In a similar manner, Bob chooses an integer b which will remain secret, calculates the ephemeral public key, $P_b=b.G$, and transmits it to Alice.

On reception of $P_b$, Alice calculates $a.P_b=ab.G$.
On reception of $P_a$, Bob calculates $b.P_a=ba.G$.

Alice and Bob henceforth share a secret element consisting in a point of the elliptic curve, ab.G. They may for example apply a hashing function, agreed beforehand between them, to one of the coordinates of the point in question to obtain a symmetrical session key with which they encipher the data on the channel.

An important limitation of the above key exchange protocol is that it is not immune to a Man-In-the-Middle type attack. Indeed, an attacker, Eve, can interpose herself between Alice and Bob, making Alice believe that she exchanges with Bob and making Bob believe that he exchanges with Alice. By implementing the protocol described above, Eve chooses a first integer x and shares a first secret element axG with Alice, then chooses a second integer y and shares a second secret element byG with Bob. Eve can thus create a first secure channel with Alice and a second secure channel with Bob. When Alice believes she is transmitting data in a secure manner to Bob, she supplies them in fact to Eve. Conversely, when Bob believes he is transmitting data in a secure manner to Alice, he transmits them in fact also to Eve.

A known solution to overcome this type of attack is to identify the transmitter of each public key. Thus, Alice transmits to Bob not only her ephemeral public key but also a digital signature of $P_a$, signed with her private key (for example by means of an ECDSA). Bob must then have at his disposal Alice's public key to verify the signature in question. If the verification is positive, this signifies that the ephemeral public key has indeed been transmitted by Alice and not by a third party. Obviously, conversely, Bob transmits to Alice his ephemeral public key $P_b=b.G$ accompanied by the signature of $P_b$, by means of Bob's private key, and Alice carries out the verification of this signature by means of Bob's public key to authenticate the origin of the ephemeral public key.

This solution is however only partially satisfactory in so far as the transmission of the public key of Alice to Bob (or that of Bob to Alice) on a non-secure channel is itself liable to be the subject of a "Man-in-the-Middle" type attack. In order to link the public key of a transmitter with his identity, a digital certificate is used (in X.509 format or instead implicit certificate, for example) delivered by a certification authority. The result is that the Diffie-Hellman protocol requires the presence of a trusted third party in order to be robust to "Man-in-the-Middle" type attacks.

In order to dispense with a trusted third party and in particular a centralised certification authority, it has been proposed to resort to a blockchain such as Bitcoin to carry out an exchange of keys according to the Diffie-Hellmann protocol. It will be recalled that a blockchain is a distributed and secure ledger of all the transactions made since the start of the chain. A complete introduction to the Bitcoin blockchain can be found in the work of A. M. Antonopoulos entitled "Mastering Bitcoin" published in 2015 by O'Reilly Media.

FIG. 1 represents such a method for exchanging keys authenticated by a blockchain.

Prior to the exchange of keys, it is assumed that Alice and Bob have each generated in an independent manner a private key (noted a for Alice and b for Bob) and, from the corresponding public key ($P_a=aG$ for Alice and $P_b=bG$ for Bob), by hashing, an ephemeral wallet address (noted @wallet_a Alice for Alice and @wallet_b Bob for Bob). The ephemeral addresses will not be used within the context of transactions supporting this exchange. The respective wallets of Bob and Alice are also assumed to be credited with cryptocurrency in sufficient quantity.

Alice forms in 110 a transaction $T_a$ and said transaction is distributed to the nodes of the Bitcoin network. After having been validated, incorporated in a block and confirmed by mining, it forms part of the distributed ledger. Similarly, Bob forms in 120 a transaction $T_b$ and said transaction is distributed step by step to the nodes of the network.

Generally speaking, a transaction represents a transfer of cryptocurrency units from an input (or from several inputs) to an output (or to several outputs). A transaction is labelled in terms of UTXO (Unspent Transaction Output), each UTXO representing an amount unspent by its owner and being locked by a locking script. In order to be able to spend a UTXO, the owner has to identify himself by presenting to the UTXO cryptographic elements (generally the public key and a signature generated from the corresponding private key) in the form of an unlocking script. If the elements presented in the unlocking script satisfy the conditions specified in the locking script, the transaction is validated. It will be noted that in Bitcoin, the unlocking script the most commonly used is Pay-to-Public-Key-Hash (P2PKH) and the locking script is scriptSig.

The transaction $T_a$ formed by Alice comprises in input a reference to a UTXO held at the wallet address @wallet_a Alice as well as an unlocking script (represented by a key in the figure). This unlocking script contains Alice's ephemeral public key, $P_a$ and a signature of this public key (more specifically the transaction in which the public key $P_a$ is substituted by the unlocking script, the transaction next being double hashed) by means of the corresponding private key, a.

The transaction $T_a$ comprises in output the wallet address of the recipient (Bob), i.e. @wallet_b Bob as well as a locking script (represented by a padlock in the figure) that Bob will be able to unlock by providing, via an unlocking script, the cryptographic elements (public key and signature) satisfying the conditions set out in the locking script. This transaction output creates a UTXO (@wallet_b Bob-amount) at Bob's ephemeral wallet address. Also indicated in output is Alice's ephemeral wallet address so that she can recover in her wallet the balance of the transaction (creation of a UTXO in Alice's ephemeral wallet).

In the same way, the transaction $T_b$ comprises in input a reference to a UTXO held at the wallet address @wallet_b Bob, as well as an unlocking script containing Bob's ephemeral public key, $P_b$, and a signature of this public key by means of the corresponding private key b.

In output, the transaction $T_b$ comprises in output Alice's ephemeral wallet address @wallet_a Alice as well as a locking script (symbolised by a padlock) that Alice will be able to unlock by providing the cryptographic elements satisfying the conditions set out in the locking script. This output creates a UTXO (@wallet_a Alice-amount) at Alice's ephemeral wallet address. A second output is provided to recover the balance in the form of a UTXO at Bob's ephemeral wallet address.

The amounts of the UTXOs @wallet_a Alice-amount and @wallet_b Bob-amount may be chosen equal to balance the exchange.

Once the transactions $T_a$ and $T_b$ have been validated, recorded in the blockchain and confirmed by mining, Alice (resp. Bob) scans the distributed ledger in search of the transaction transmitted by Bob (resp. Alice). Alice recovers in the input part of $T_b$ the ephemeral public key $P_b$ of Bob and, conversely, Bob recovers in the input part of $T_a$ the ephemeral public key $P_a$ of Alice. Alice then calculates $aP_b=abG$ and Bob $bP_a=baG$: Alice and Bob consequently have at their disposal the shared secret key abG.

The auditability of the distributed ledger allows all the users (nodes) to verify that the ephemeral public keys used in this exchange have never been used beforehand, that the public key $P_a$ indeed belongs to Alice (more specifically is linked to Alice's ephemeral wallet address) and that the public key $P_b$ indeed belongs to Bob (more specifically is linked to Bob's ephemeral wallet address). Thus, the exchange of keys between Alice and Bob can be authenticated by the blockchain, without intervention of a trusted third party.

However, the systematic generation of ephemeral wallet addresses at each exchange of keys may prove to be complicated to manage and costly in terms of calculation resources for the remote devices hosting these wallets.

The article of McCorry et al. entitled "Authenticated key exchange over Bitcoin" published in 2015 in Chen. L, Matsuo S. (eds.) Security Standardisation Research, Lecture Notes in Computer Science, vol. 9497, Springer, describes a method for exchanging keys using as ephemeral keys the keys that are used to sign the transactions. This method makes it possible to dispense with the generation of ephemeral wallet addresses but is on the other hand sensitive to attacks against ECDSA signatures.

An object of the present invention is consequently to propose a method for exchanging keys between peers, authenticated by blockchain and thus without resorting to a trusted third party, which does not require the generation of ephemeral wallets while being robust to cryptanalytic attacks.

DESCRIPTION OF THE INVENTION

The present invention is defined by a method for exchanging keys between a first user and a second user of a blockchain of transactions, each user having at their disposal a wallet address allowing said user to transmit and to receive transactions, said method comprising the following steps:
  the first user generates a first ephemeral private key (a) and a corresponding first ephemeral public key ($P_a$) by means of an asymmetric cryptosystem;
  the first user forms and transmits a first transaction ($T_A$) of which the input refers to a first UTXO held at the wallet address of the first user and of which the output creates a second UTXO in the wallet of the second user, the output of the first transaction further comprising a script for recording the first ephemeral public key ($P_a$) in the blockchain;
  the second user scans the blockchain and accesses the first transaction, after it has been confirmed by a mining of the block that contains it;
  the second user verifies from the input of the first transaction that said transaction has indeed been transmitted by the wallet address of the first user and, if so, reads on the output of the first transaction the first ephemeral public key ($P_a$);
  the second user generates a second ephemeral private key (b) and a corresponding second ephemeral public key ($P_b$) by means of said asymmetric cryptosystem;
  the second user forms and transmits a second transaction ($T_B$) of which the input refers to a third UTXO held at the wallet address of the second user and of which the output creates a fourth UTXO pointing to the wallet of the first user, the output of the second transaction further comprising a script for recording the second ephemeral public key in the blockchain;
  the first user scans the blockchain and accesses the second transaction, after it has been confirmed by a mining of the block that contains it;
  the first user verifies from the input of the second transaction that said transaction has indeed been transmitted by the wallet address of the second user and reads on the output of the second transaction the second ephemeral public key ($P_b$);

the first user calculates the product of the first ephemeral private key (a) with the second ephemeral public key ($P_b$) and the second user calculates (280) the product of the second ephemeral private key (b) with the first ephemeral public key ($P_a$) to generate a common secret key ($k_{ab}$).

Advantageously:

the first transaction contains in input an unlocking script comprising the public key associated with the wallet address of the first user as well as a digital signature of this public key by means of the first ephemeral private key;

the second transaction contains in input an unlocking script comprising the public key associated with the wallet address of the second user as well as a digital signature of this public key by means of the second ephemeral private key.

The asymmetric cryptosystem is preferably an elliptic curve cryptosystem.

The blockchain is typically Bitcoin and the script for recording first and second transactions contains an operation OP_RETURN, the first and second ephemeral public keys being stored by the recording script in compressed form in the blockchain.

Alternatively, the first and second transactions comprise in output a second recording script, the recording script and the second recording script containing the operations OP_RETURN, the first and second ephemeral public keys being respectively stored by the recording script and the second recording script in complete form in the blockchain.

The amounts of the first and third UTXOs may be identical.

BRIEF DESCRIPTION OF THE DRAWINGS

Other characteristics and advantages of the invention will become clear from reading a preferential embodiment of the invention, made with reference to the appended figures among which.

DETAILED DESCRIPTION OF PARTICULAR EMBODIMENTS

A Bitcoin type blockchain of transactions will firstly be considered, such as described in the introduction section and an exchange of keys between two users of the blockchain, Alice and Bob, will again be envisaged. As will be seen hereafter, this exchange of keys may be generalised to a multilateral exchange between peers. Each user is equipped with a communication device embarking a blockchain client, either a thin client (for example for a smartphone), or a complete client (the device is then a "complete" node, it has a complete copy of the shared ledger). Each user has a wallet address that allows said user to transmit and to receive transactions and messages.

Prior to the exchange of keys, Alice and Bob exchange their wallet addresses for example in digital form or instead in QR code form. Alice's wallet address is noted @wallet_Alice and that of Bob's wallet, @wallet_Bob.

Figure 1:
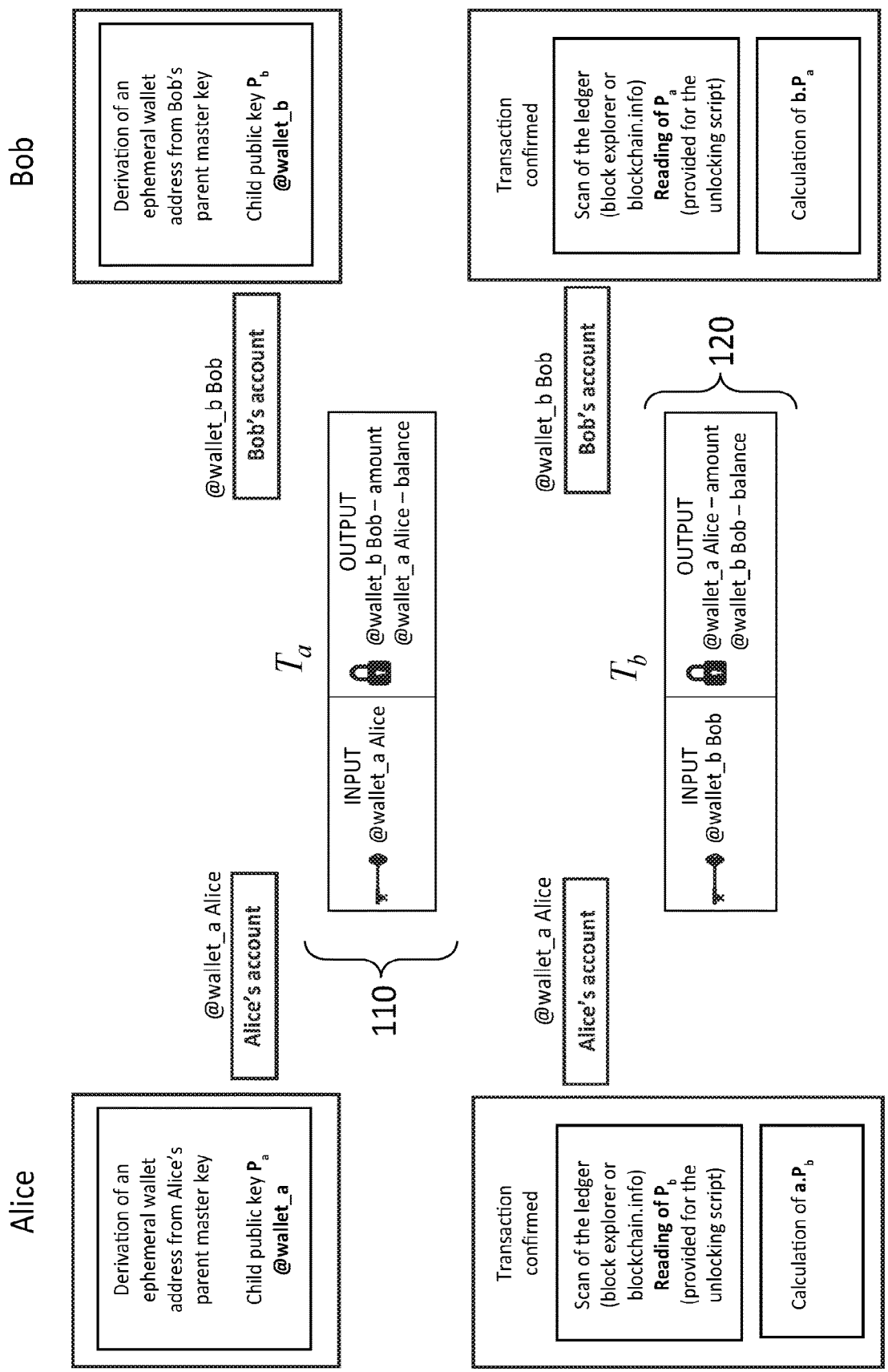
FIG. 1, already described, schematically represents an exchange of keys between peers, authenticated by a blockchain, according to a method known from the prior art.
Figure 2:
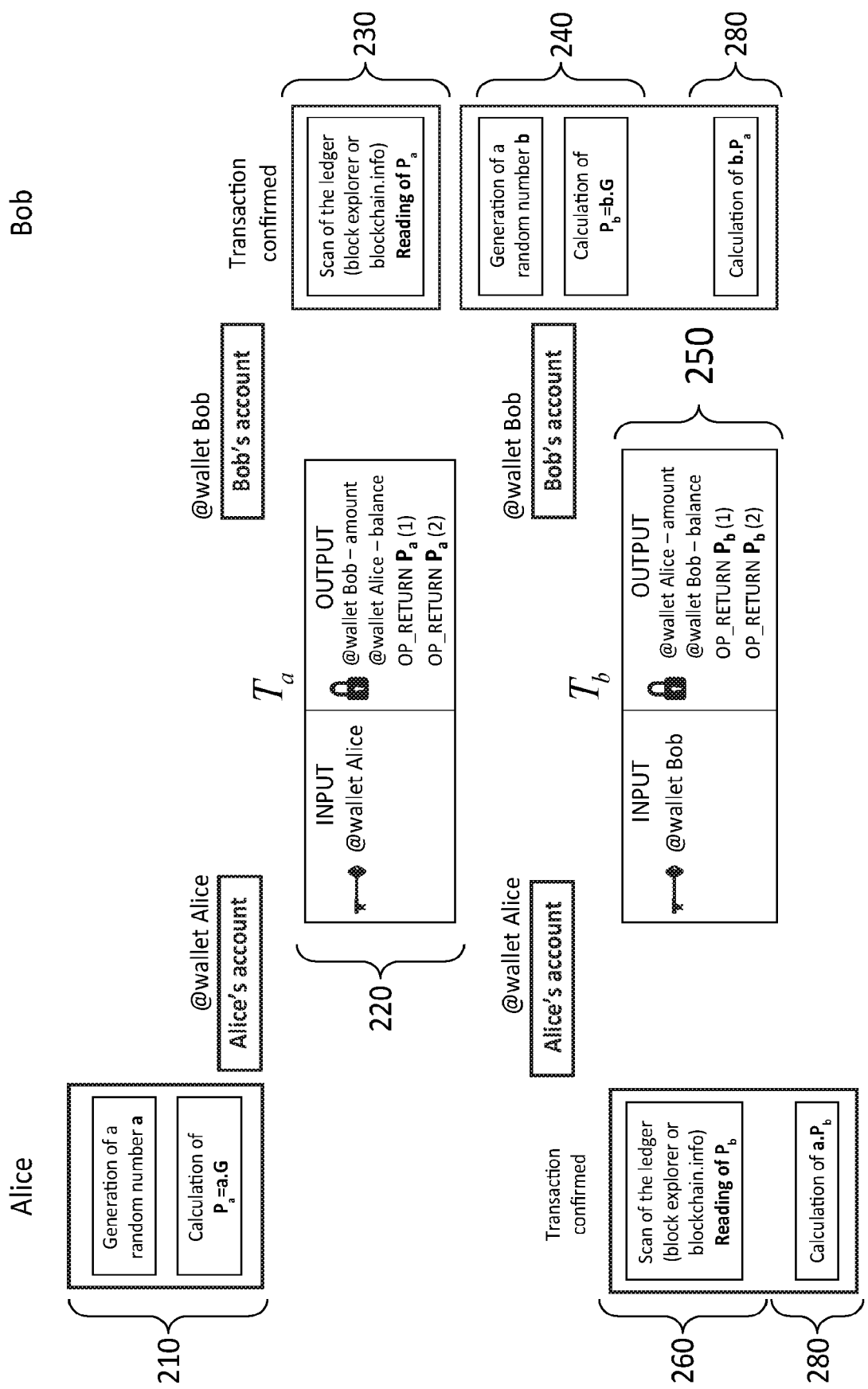
FIG. 2 schematically represents an exchange of keys between peers, authenticated by a blockchain, according to an embodiment of the invention.

FIG. 2 schematically describes a method for exchanging keys according to a first embodiment of the invention.

In a first step, 210, a first user (or first peer), Alice, generates a private key a and the corresponding public key, $P_a = aG$ where G is the generating point of an elliptic curve cryptosystem, for example the Koblitz curve cryptosystem secp256k1 used in Bitcoin to generate wallet addresses. The key $P_a$ is an ephemeral public key in so far as it will only serve for the exchange of keys between Alice and Bob.

The private key may be generated in a random manner (so-called non-deterministic key wallet) or instead in a deterministic manner from a seed (so-called deterministic hierarchical key wallet) in a manner known per se.

At step 220, Alice forms a transaction $T_A$ comprising in input a reference to a UTXO (recorded in the blockchain and held at the wallet address @wallet_Alice) as well as an unlocking script (symbolised in the figure by a key). This unlocking script contains the public key $P_a$ corresponding to Alice's wallet address @wallet_Alice as well as a signature of Alice's public key (more specifically the transaction in which the public key $P_a$ is substituted by the unlocking script, the transaction next being double hashed) by means of her private key. The unlocking script allows Alice to spend the credits contained in the UTXO in question.

On a first output, the transaction $T_A$ comprises the wallet address of the recipient (second user or second peer), Bob, i.e. @wallet_Bob, the amount agreed for this transaction, in other words the amount of the UTXO created at this address (@wallet_Bob-amount), the whole protected by a locking script (padlock represented in the figure). Bob will be able to unlock the UTXO created by this output by presenting the cryptographic elements required by the locking script (Bob's public key and his signature) to verify his identity (more specifically the association between the wallet address @wallet_Bob and the public key).

Optionally, on a second output, the transaction $T_A$ comprises in output Alice's wallet address to receive the balance of the transaction, if the amount that Alice possesses in input (figuring in the UTXO at Alice's wallet address) is greater than the amount sent to Bob (that is to say greater than the amount figuring in the UTXO created at Bob's wallet address).

On a third output, the transaction $T_A$ comprises at least one script for recording data in the blockchain, OP_RETURN <data>. The operator OP_RETURN creates a "provably unspendable" entity which is not stored with the UTXO. Unlike a UTXO, the entity thereby created cannot next be spent by means of an unlocking script.

In the transaction $T_A$, the data of the script OP_RETURN correspond to the ephemeral public key $P_a$, in compressed form or in complete form. In Bitcoin, the operation OP_RETURN makes it possible to store up to 40 octets in the blockchain. A public key obtained with an elliptic curve cryptosystem secp256I1 may be stored in compressed form on 32 octets. If an additional script OP_RETURN is called on, it will be possible to store up to 80 octets, which would make it possible to store the ephemeral key $P_a$ in complete form (64 octets).

Once the transaction $T_A$ has been validated, recorded in the blockchain and confirmed, the amount agreed between Alice and Bob, corresponding to the UTXO created on the first output of $T_A$, is credited in Bob's wallet.

When Bob receives the confirmation of this amount, he scans in 230 the ledger of the blockchain in order to view the corresponding transaction. In the case of the Bitcoin blockchain, he may for example use the blockchain.info command or block explorer in order to view the transaction.

After having found the transaction, Bob reads on his input Alice's wallet address at the origin of the transaction and compares it with the address that Alice had supplied him with beforehand (for example by means of a QR code). He can thus ensure that these addresses are the same. Bob next reads on the third and, if need be, the fourth output(s) of the transaction, the value of the ephemeral public key $P_a$.

At step 240, Bob generates on his side a private key b (for example from a seed) and the corresponding public key $P_b$=bG using the same elliptic curve cryptosystem as that used by Alice.

At step 250, Bob forms a transaction $T_B$ in the same way as Alice previously. In other words, Bob provides in input of the transaction, in an unlocking script (for example P2PKH in Bitcoin), the cryptographic elements (Bob's public key and signature by his private key) required to unlock the locking script locking the UTXO in first output of the transaction.

The first output of the transaction $T_B$ comprises Alice's wallet address, @wallet_Alice, the agreed amount transferred to Alice, the whole protected by a locking script (P2PKH for example). Alice will be able to unlock the UTXO created by this output by presenting the cryptographic elements required by the locking script (Bob's public key and his signature).

Optionally, on a second output, the transaction $T_B$ comprises in output Bob's wallet address to receive the balance of the transaction, if the amount that Bob possesses in input is greater than the amount sent to Alice.

Advantageously, on a third output, the transaction $T_B$ comprises at least one script for recording data in the blockchain, OP_RETURN <data>, where the data correspond to the ephemeral public key $P_b$ in compressed form or in complete form. As already indicated above, the script OP_RETURN <data> in Bitcoin makes it possible to store 40 octets. An additional script for recording data makes it possible to store 80 octets and thus the key $P_b$ in complete form.

Once the transaction $T_B$ has been validated, recorded and confirmed, the amount agreed between Alice and Bob, corresponding to the UTXO created on the first output of $T_B$, is credited in Bob's wallet.

When Alice receives the confirmation of this amount, she scans in 260 the ledger of the blockchain to view the corresponding transaction (using for example the blockchain.info command or block explorer when the blockchain is Bitcoin).

When Alice has found the transaction, Alice reads on her input Bob's wallet address behind the transaction and compares it with the address that Bob had provided her with beforehand. She thus ensures that these addresses are the same. Alice next reads, on the third and, if need be, the fourth output(s) of the transaction, the value of Bob's ephemeral public key, $P_b$.

At step 280, Alice calculates, from Bob's ephemeral public key, the secrete key $aP_b$=abG. Bob does the same from Alice's ephemeral public key and calculates $bP_a$=baG. Thus, Alice and Bob henceforth share a secrete key $k_{ab}$=abG that they can use to make secure a communication channel either on the blockchain, or on an out-of-blockchain channel. This shared key may notably make it possible to ensure the confidentiality of data or be used for authentication purposes.

It will be noted that the amounts @wallet_Bob-amount and @wallet_Alice-amount may be chosen equal, in such a way that the cost of the exchange is zero or very little (limited to the transaction fees intended for the mining).

Those skilled in the art will understand that the exchange of keys illustrated in FIG. 2 does not require the intervention of a trusted third party. The auditability of the ledger by the users of the blockchain enables each of them to verify that the ephemeral public keys used during this process have never served beforehand, that the public key $P_a$ indeed belongs to Alice (more specifically is linked in a one-to-one manner to Alice's wallet address) and that the public key $P_b$ indeed belongs to Bob (more specifically is linked in a one-to-one manner to Bob's wallet address). Due to this auditability, the exchange of keys is protected from a Man-In-the-Middle type attack.

Finally, it is essential to note that, unlike the prior art cited in the introduction section, the exchange of keys does not require creating ephemeral wallets but makes do with using Alice's and Bob's existing wallets.

The invention claimed is:

1. A method for exchanging keys between a first user and a second user of a blockchain of transactions, each user having at their disposal a wallet address enabling said user to transmit and to receive transactions, wherein:

the first user generates a first ephemeral private key and a corresponding first ephemeral public key by means of an asymmetric cryptosystem;

the first user forms and transmits a first transaction of which the input refers to a first UTXO held at the wallet address of the first user and of which the output creates a second UTXO in the wallet of the second user, the output of the first transaction further comprising a script for recording the first ephemeral public key in the blockchain;

the second user scans the blockchain and accesses the first transaction, after said transaction has been confirmed by a mining of the block that contains it;

the second user verifies from the input of the first transaction that said transaction has indeed been transmitted by the address of the wallet of the first user and, if so, reads on the output of the first transaction the first ephemeral public key;

the second user generates a second ephemeral private key and a corresponding second ephemeral public key by means of said asymmetric cryptosystem, the second user forms and transmits a second transaction of which the input refers to a third UTXO held at the wallet address of the second user and of which the output creates a fourth UTXO pointing to the wallet of the first user, the output of the second transaction further comprising a script for recording the second ephemeral public key in the blockchain;

the first user scans the blockchain and accesses the second transaction, after said transaction has been confirmed by a mining of the block that contains it;

the first user verifies from the input of the second transaction that said transaction has indeed been transmitted by the address of the wallet of the second user and reads on the output of the second transaction the second ephemeral public key;

the first user calculates the product of the first ephemeral private key with the second ephemeral public key and the second user calculates the product of the second ephemeral private key with the first ephemeral public key to generate a common secrete key.

2. The method for exchanging keys according to claim 1, wherein:

the first transaction contains in input an unlocking script comprising the public key associated with the wallet address of the first user as well as a digital signature of this public key by means of the first ephemeral private key;

the second transaction contains in input an unlocking script comprising the public key associated with the wallet address of the second user as well as a digital signature of this public key by means of the second ephemeral private key.

3. The method for exchanging keys according to claim 1, wherein the asymmetric cryptosystem is an elliptic curve cryptosystem.

4. The method for exchanging keys according to claim 3, wherein the blockchain is Bitcoin and that the script for recording the first and second transactions contains an operation OP_RETURN, the first and second ephemeral public keys being stored by the recording script in compressed form in the blockchain.

5. The method for exchanging keys according to claim 3, wherein the blockchain is Bitcoin and that the first and second transactions comprise in output a second recording script, the recording script and the second recording script containing the operations OP_RETURN, the first and second ephemeral public keys being respectively stored by the recording script and the second recording script in complete form in the blockchain.

6. The method for exchanging keys according to claim 1, wherein the amounts of the first and third UTXOs are identical.

* * * * *